United States Patent
Iwashita et al.

(10) Patent No.: US 6,741,057 B2
(45) Date of Patent: May 25, 2004

(54) SERVO CONTROLLER FOR PREVENTING DOWNWARD DISPLACEMENT IN GRAVITATING AXIS

(75) Inventors: Yasusuke Iwashita, Yamanashi (JP); Tadashi Okita, Yamanashi (JP); Satoshi Ikai, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 73 days.

(21) Appl. No.: 10/269,961

(22) Filed: Oct. 15, 2002

(65) Prior Publication Data

US 2003/0076066 A1 Apr. 24, 2003

(30) Foreign Application Priority Data

Oct. 19, 2001 (JP) ........................................ 2001/321569

(51) Int. Cl.[7] ............................................ G05B 19/404
(52) U.S. Cl. .................................. 318/632; 318/568.22
(58) Field of Search .......................... 318/568.22, 612, 318/614, 615, 619, 621, 632

(56) References Cited

U.S. PATENT DOCUMENTS 3,916,279 A * 10/1975 Kawano et al. ............. 318/430
4,367,532 A * 1/1983 Crum et al. ................. 700/260
4,733,150 A * 3/1988 Papiernik et al. ........... 318/632
5,136,227 A * 8/1992 Nakano et al. .............. 318/689
5,691,615 A * 11/1997 Kato et al. .................. 318/609

* cited by examiner

*Primary Examiner*—Bentsu Ro
(74) *Attorney, Agent, or Firm*—Staas & Halsey LLP

(57) ABSTRACT

A servo controller capable of preventing downward displacement of a gravitating axis of a machine when an excitation of a servomotor for driving the gravitating axis is discontinued. When a shutdown command is issued, a command for shifting a position of the gravitating axis by an offset amount in a direction opposing the gravitation is issued to a servo system. Also, a command for operating a mechanical brake to apply a braking force on the gravitating axis is issued. After a predetermined time period, the excitation of the servomotor is discontinued. The position of the gravitating axis is shifted upward by the offset amount within a time-lag between an issuance of the mechanical brake operating command and actual application of the braking force by the mechanical brake, and the braking force is applied to the gravitating axis at the shifted position. When the excitation of the servomotor is discontinued, the downward displacement of the position of the gravitating axis due to a backlash of the mechanical brake is compensated by the upward shifting of the gravitating axis, thereby movable elements connected to the gravitating axis is prevented from collision or interference with peripheral objects.

9 Claims, 3 Drawing Sheets

SERVO CONTROLLER FOR PREVENTING DOWNWARD DISPLACEMENT IN GRAVITATING AXIS

BACKGROUND OF THE INVENTION

1. Field of the Invention

The present invention relates to a servo controller for controlling a servomotor for driving a feed shaft in a machine tool or a manufacturing machine, an arm of an industrial robot, etc. and in particular to a servo controller for a servomotor for a gravitating axis to which gravitation is exerted in the machine having a mechanical brake for applying a braking force on the gravitating axis.

2. Description of Related Art

A movable element in a machine such as a feed shaft of a machine tool or an manufacturing machine and an arm of an industrial robot is driven by a servomotor and a position of an axis connected to the movable element is controlled by the servomotor to be shifted to a commanded position and maintain the commanded position. When the servomotor is turned from an operational state to a non-operational state, i.e., an excitation of the servomotor is discontinued due to an emergency stop, an outage of the power source, etc., the position of the axis to which an external force is exerted is displaced. Particularly, with respect to an axis to which the gravitation is exerted in an operating direction thereof, which is referred to as a gravitating axis, the gravitating axis always receives the gravitation and the position of the gravitating axis displaces downward by the gravitation when the excitation of the servomotor for driving the gravitating axis is discontinued.

Conventionally, when an emergency stop is commanded in an operation of the servomotor for driving the gravitating axis, a velocity command in the servo system for the servomotor is made "0" to stop the motion of the gravitating axis as soon as possible. Then, a command to operate the mechanical brake is issued and after a time period (typically 100 ms–200 ms) sufficient for the mechanical brake to apply the braking force on the axis, the excitation of the servomotor is discontinued. With the above sequential control, the down displacement of the gravitating axis is prevented in the emergency stop.

When the excitation of the servomotor is discontinued in the state of applying the braking force on the gravitating axis by the mechanical brake, the gravitational force on the gravitating axis, which has been borne by the output torque of the servomotor, is borne solely by the mechanical brake. A frictional contact part of the mechanical brake is made fixed to the gravitating axis and the gravitational force is applied to the contact part. As a result, the position of the gravitating axis is displaced downwardly by an amount of a backlash formed by a torsion between a proximal portion and a distal contacting portion of the contacting part. It has been difficult to prevent the downward displacement of the gravitating axis caused by the backlash of the mechanical brake.

SUMMARY OF THE INVENTION

An object of the present invention is to provide a servo controller capable of preventing a downward displacement of a gravitating axis on which gravitation is exerted when an excitation of a servomotor for driving the gravitating axis is discontinued.

A servo controller of the present invention comprises: brake operation commanding means for issuing a brake operating command to a mechanical brake for applying a braking force on a gravitating axis to which gravitation is exerted when an excitation of a servomotor for driving the gravitating axis is discontinued; and offset commanding means for issuing an offset command for driving the servomotor such that a position of the gravitating axis is shifted by an offset amount in a direction opposing to the gravitation exerted on the gravitating axis when the excitation of the servomotor is discontinued.

The offset amount may be set not less than a backlash in the mechanical brake, so that the downward displacement of the gravitating axis due to the backlash of the mechanical brake is within the offset amount.

In the case where the servo controller performs a position loop control of the servomotor, the offset command may be provided to the position loop control as a position command.

In the case where the servo controller performs a velocity loop control, the offset command may be provided to the velocity loop control as a velocity command to drive the servomotor at a predetermined velocity for a predetermined time period.

The excitation of the servomotor may be discontinued when an emergency stop is commanded, when an outage of a power source of the servo controller is detected and when the machine does not operate for a set time period.

It is preferable that a shifting motion of the gravitating axis due to the offset command is completed before the braking force of the mechanical brake is actually applied on the gravitating axis.

The offset command and the brake operating command may be issued simultaneously when the excitation of the servomotor is discontinued.

DETAILED DESCRIPTION OF THE PREFERRED EMBODIMENTS

Figure 1:
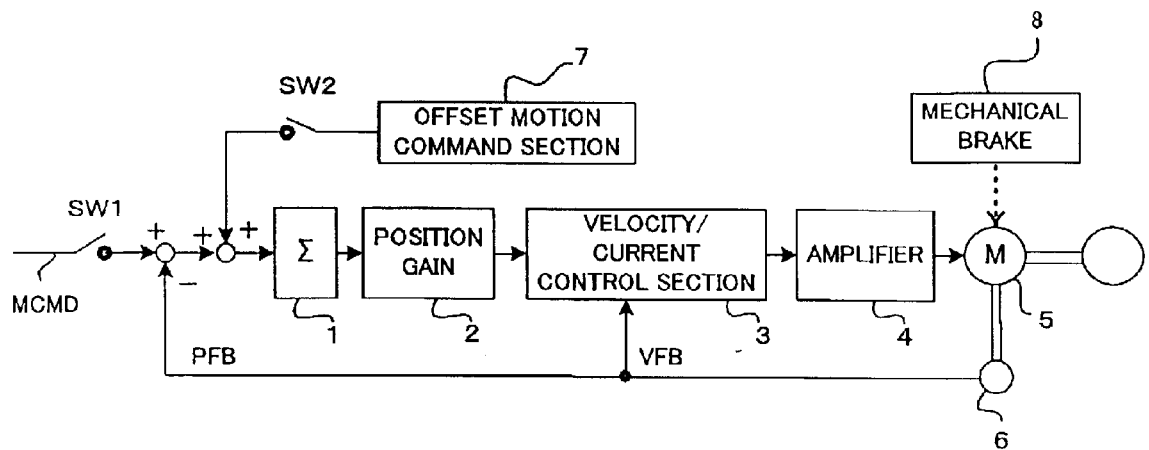
FIG. 1 is a block diagram of a servo system constituted by a servo controller according to an embodiment of the present invention.

FIG. 1 shows a servo system for driving a gravitating axis, which is constituted by a servo controller according to an embodiment of the present invention. In this embodiment, the servo system performs a position loop control and a velocity loop control of a servomotor. In a normal operational state, a switch SW1 is turned on and a switch SW2 is turned off. A position/velocity detector 6 mounted on a servomotor 5 detects rotational position and velocity of the servomotor 5 and outputs a position feedback signal representing a position feedback amount PFB and a velocity feedback signal representing a velocity feedback amount VFB. The position feedback amount PFB from the position/velocity detector 6 is subtracted from a motion command MCMD distributed from a motion command generating section in a host controller, such as a numerical controller and a robot controller, to obtain a position deviation and the obtained position deviation is stored in an error counter 1. The position deviation is multiplied by a position gain in a term 2 of position gain to obtain a velocity command and the obtained velocity command is inputted to a velocity/current control section 3. The velocity/current control section 3 performs a velocity loop control using the velocity command and the velocity feedback amount VFB from the position/velocity detector 6 to obtain a torque command (current command). Then, a current loop control is performed based on the torque command and a current feedback signal from a current detector (not shown) to drivingly control a servomotor 5 through an amplifier 4. The above controls of the position loop, velocity loop and current loop are executed by a processor of the servo controller.

An offset motion command section 7 is provided for issuing an offset motion command for driving the servomotor by a predetermined offset amount in a direction opposing the gravitation exerted on the gravitating axis. The switch SW2 is provided for inputting the offset motion command into the position loop of the servo system. Further, a mechanical brake 8 is provided for applying a brake force on the gravitating axis. In this embodiment, the mechanical brake 8 applies the braking force on an output shaft of the servomotor 5. The braking force may be applied on a transmission mechanism from transmitting a drive force from the servomotor to an movable element. A brake operating command is issued to the mechanical brake 8 for a shutdown operation when a supply of electric power for exciting the servomotors is cut off due to an emergency stop, an outage of a power supply, etc. In the shutdown operation, the switch SW1 is turned OFF to make the motion command MCMD from the host computer "0", and the switch SW2 is turned ON and the offset motion command is outputted from the offset motion command section 7 to the error counter 1 for driving the servomotor 5 by the predetermined offset amount in the direction opposing the gravitation. The position of the gravitating axis is shifted by the predetermined offset amount in the direction opposing the gravitation. Then, the supply of electric power to the servomotor 5 is cut off to discontinue an excitation of the servomotor 5.

Figure 2:
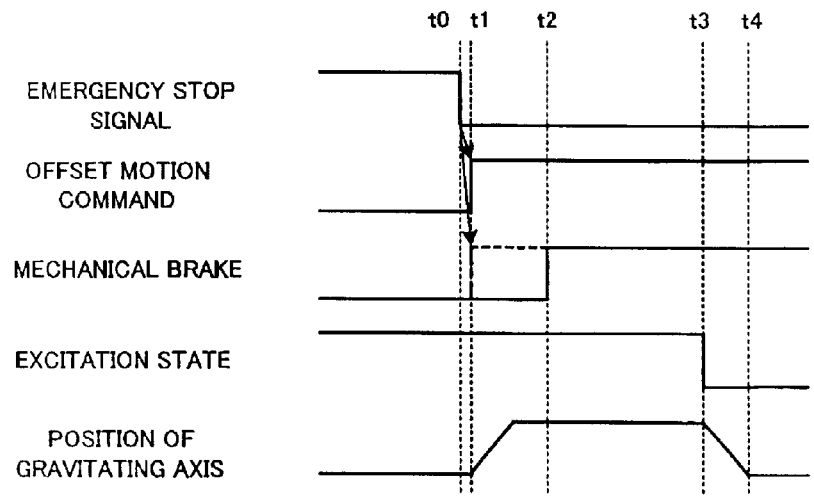
FIG. 2 is a timing chart of operations of the servo controller and a mechanical brake when a shutdown command is issued.

FIG. 2 is a timing chart of operations of the servo controller and the mechanical brake in the shutdown operation.

As shown in FIG. 2, when a shutdown command is issued at point t0 in time, a shutdown signal is turned to Level at point t1 in time. An offset motion command for driving the servomotor 5 by the predetermined offset amount in a direction opposing the gravitation is issued at point t1 in time in response to the L-level shutdown signal. In response to the offset motion command, the switch SW2 is turned ON and the offset motion command is inputted into the error counter 1. Simultaneously, a brake operating command is issued to operate the mechanical brake 8 at the point t1 in time. There is a time-lag between an instant of the issuance of the brake operating command and an instant at which the mechanical brake is actually operated to effect a braking force on the gravitating axis to be locked. A time period indicated by the dotted line shows the time-lag of the operation of the mechanical brake 8.

Due to the offset motion command, the gravitating axis is driven in the direction opposite to the gravitating direction to shift to a position commanded by the offset motion command within the time-lag of the operation of the mechanical brake 8 and maintains the commanded position. After completion of the shifting motion of the gravitating axis, the braking force of the mechanical brake 8 is actually applied on the gravitating axis at a point t2 in time. After the mechanical brake 8 actually effected the braking force 100 ms–200 ms later than the issuance of the brake operating command, the supply of electric power to the servomotor 5 is cut off to de-energize the servomotor 5 at a point t3 in time. When the supply of the electric power to the servomotor 5 is cut off and thus an output torque of the servomotor 5 is turned to "0", a load by the gravitation exerted on the gravitating axis, which has been borne by the output torque of the servomotor 5, is solely borne by the mechanical brake 8 which is applying the braking force on the gravitating axis at the position shifted by the predetermined offset amount. By the load by the gravitation exerted on the gravitating axis, the position of the gravitating axis is displaced in the gravitating direction by an amount corresponding to a backlash of the mechanical brake 8. However, since the position of the gravitating axis has been shifted by the offset amount in the direction opposing the gravitation, the gravitational down of the gravitating axis is compensated by the advance offset motion by the offset amount, so that the movable elements connected to the gravitating axis is prevented from a collision or an interference with peripheral objects.

In the above example shown in FIG. 2, the brake operating command is issued simultaneously with the offset motion command for shifting the gravitating axis when a shutdown command is issued so as to operate the mechanical brake 8 as soon as possible in response to the shutdown command. The brake operating command may be issued after the issuance of the offset motion command so as to secure that the offset motion of the gravitating axis is completed before the braking force of the mechanical brake 8 is actually applied on the gravitating axis.

Figure 3:
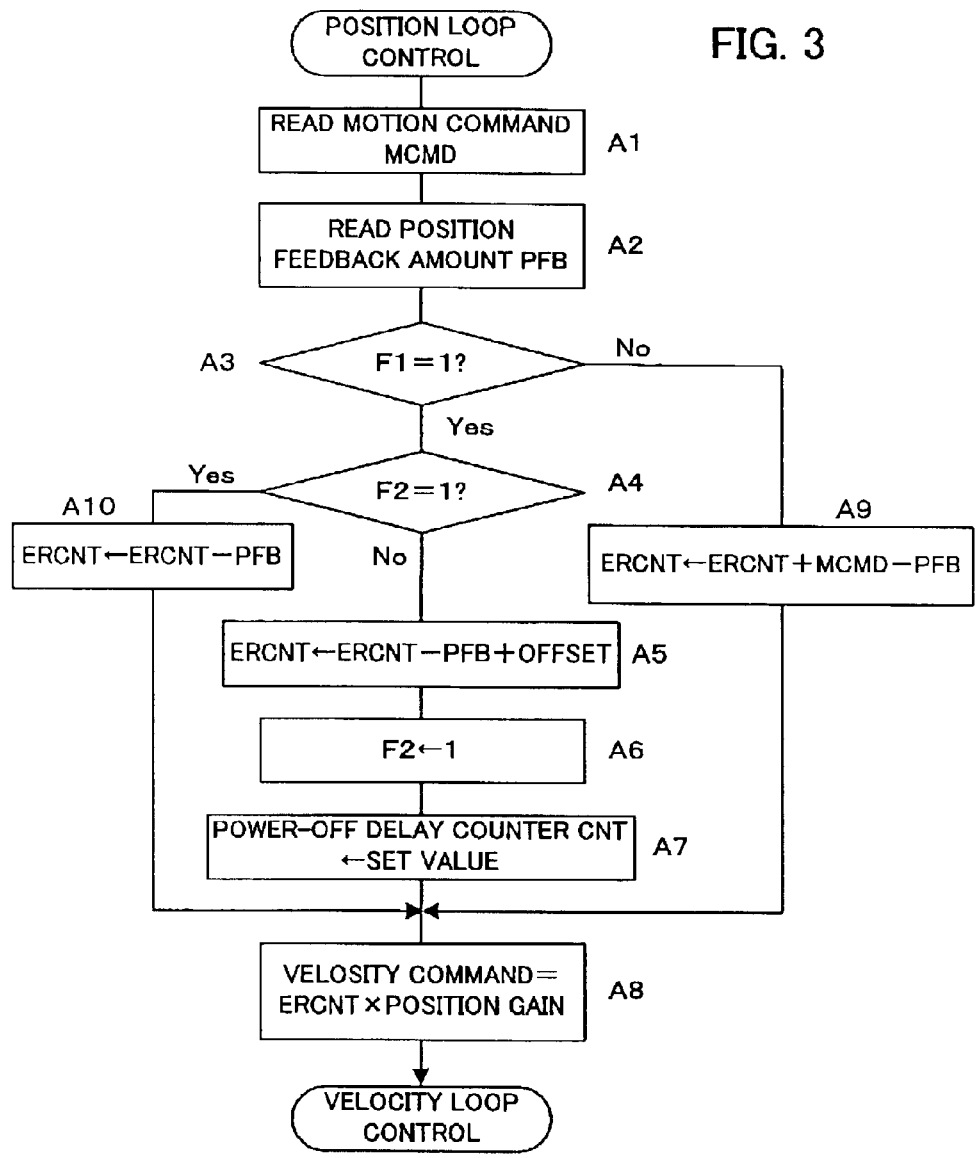
FIG. 3 is a flowchart of processing for a position loop control including shutdown processing according to the present invention.

FIG. 3 is a flowchart of position loop processing including the above described shutdown processing to be executed by the processor of the servo controller at every predetermined processing period.

The processor of the servo controller reads a motion command MCMD distributed from the host controller (Step A1) and reads a position feedback amount PFB form the position/velocity detector 6 (Step A2), and determines whether or not a shutdown flag F1 indicating an issuance of a shutdown command (Step A3) is set to "1". The shutdown flag F1 and an offset command issuance flag indicating that an offset motion of the gravitating axis is completed are set to "0" when supply of electric power to the servo controller is turned ON.

If it is determined that the shutdown flag F1 is "0" indicating that a shutdown command has not been issued, the procedure proceeds from Step A3 to Step A9 at which the position feedback amount PFB read in Step A2 is subtracted from the motion command MCMD read in Step A1 to obtain a position deviation and the obtained position deviation is added to the error counter ERCNT to update the position deviation. A velocity command is obtained by multiplying the position deviation stored in the error counter by a position gain (Step A8) and the obtained velocity command is outputted to the velocity loop, to complete the position loop processing in the present processing period.

Unless the shutdown flag F1 turns to "1" by an issuance of the shutdown command, the above position loop processing of Steps A1–3, A9 and A8 is repeatedly executed.

When it is determined that the shutdown flag F1 turns to "1" indicating an issuance of the shutdown command at Step A3, it is further determined whether or not the offset command issuance flag F2 is set to "1" (Step A4). Since the flag F2 is initially set to "0", the procedure proceeds from Step A4 to Step A5. In Step A5, the position feedback amount PFB read in Step A2 is subtracted from the value of the error counter ERCNT and a predetermined offset amount OFFSET is added to the value of the error counter ERCNT, to update the position deviation. By the processing of Step A5, the offset motion command for driving the servomotor 5 in the direction opposing the gravitation by the offset motion amount OFFSET is inputted to the position loop control. The positive value of the offset motion amount OFFSET indicates the direction opposing the gravitation on the gravitating axis.

Then, the offset command issuance flag F2 is set to "1" (Step A6) and a predetermined value is set to a power-off delay counter CNT (Step A7), and the position deviation stored in the error counter ERCNT is multiplied by the position gain to obtain the velocity command (Step A8), and the obtained velocity command is outputted to the velocity loop.

In the subsequent processing periods, since the flag F1 and the flag F2 are both set to "1", the procedure proceeds from Step A4 to Step A10 at which the position feedback amount PFB is subtracted from the error counter ERCNT to update the position deviation. The updated position deviation is multiplied by the position gain to obtain the velocity command (Step A8) and the obtained velocity command is outputted to the velocity loop.

With the above processing, the offset motion amount OFFSET for shifting the position of the gravitating axis in the direction opposing the gravitation is added to the position deviation in one processing period immediately after the shutdown flag F1 is turned from "0" to "1", and thereafter no motion command is inputted to the position loop. Thus, the servomotor 5 for driving the gravitating axis is driven to shift the position of the gravitating axis in the direction opposing the gravitation by the offset amount OFFSET and maintains the shifted position of the gravitating axis.

Figure 4:
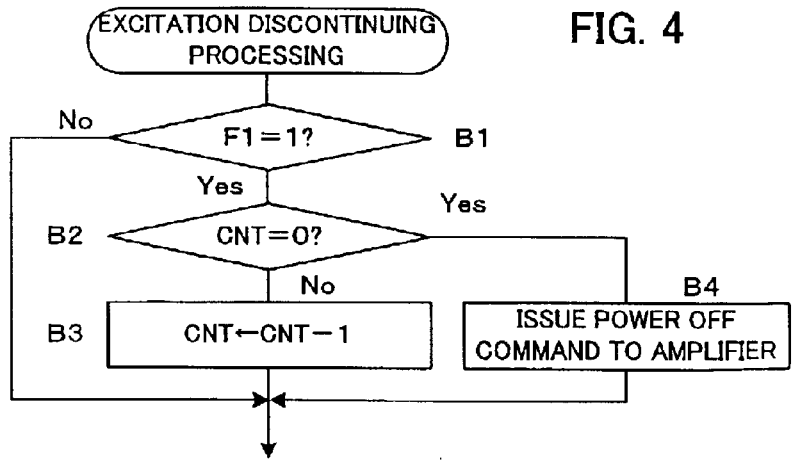
FIG. 4 is a flowchart of processing for discontinuing an excitation of the servomotor.

The processor of the servo controller also executes the processing for discontinuing the excitation of the servomotor as shown in FIG. 4 at every predetermined period. First, it is determined whether or not the shutdown flag F1 is set to "1" (Step B1) and if it is determined that the flag F1 is not set to "1", the procedure terminates without proceeding to any further processing to maintain the exciting state of the servomotor.

When the shutdown command is issued and it is determined that the shutdown flag F1 is set to "1" at Step B1, it is further determined whether or not the value of the power-off delay counter CNT is "0" (Step B2). If the value of the power-off counter CNT is not "0", "1" is subtracted from the counter CNT to terminate the processing in the present processing period. Subsequently, the processing of Steps B1–B3 is executed until the value of the power-off delay counter CNT reaches "0" at every processing period. When it is determined that the value of the power-off delay counter Cnt is "0" at Step B2, the procedure proceeds from Step B2 to Step B4 at which a command to cut off the supply of the electric power to the servomotor 5 is issued and terminates the procedure in the present processing period. As a result, the excitation of the servomotor is discontinued.

Thus, the excitation of the servomotor 5 is discontinued after a delay of a predetermined time period, which is proportional to the predetermined value set in the power-off delay counter CNT, from the issuance of the shutdown command.

When the excitation of the servomotor for driving the gravitating axis is discontinued and thus the output torque of the servomotor is made "0", the brake force of the mechanical brake 8 is already applied to the gravitating axis and all of the load exerted on the gravitating axis is applied to the mechanical brake 8. The position of the gravitating axis is displaced down in the direction of gravitation by the amount corresponding to the backlash of the mechanical brake 8. However, since the position of the gravitating axis has been shifted up by the offset amount, the position of the gravitating axis displaces downward within the offset amount, to prevent the movable elements connected to the gravitating axis from collision or interference with peripheral objects.

It is preferable to set the offset amount for shifting up the gravitating axis to be a little greater than the backlash of the mechanical brake. The offset amount is set to be not smaller than the backlash of the mechanical brake 8. The brake operating command and the offset motion command are issued when the shutdown command is issued. In the above described example, the braking force of the mechanical brake 8 is actually effected after completion of the offset motion of the gravitating axis by the offset motion command, so that the amount of the gravitational displacement of the gravitating axis is within the backlash of the mechanical brake 8. In a case where the braking force of the mechanical brake 8 is applied on the gravitating axis in the middle of shifting motion of the gravitating axis, a frictional force is exerted on the mechanical brake 8 in a direction of the offset motion of the gravitational direction to cause a displacement of a sliding member of the mechanical brake 8 in the direction of the shifting motion opposing to the gravitation. In this case, the position of the gravitating axis is displaced by an amount of the sum of the displacement and the backlash amount when the excitation of the servomotor is discontinued. Thus, it is preferable to set the offset amount a little greater than the backlash of the mechanical brake 8.

In the foregoing embodiment, the shutdown command is issued when the an emergency stop command is issued. The shutdown command may be issued when an outage of the power source is detected to perform the above described shutdown processing.

The servo controller has an inner power source such as a capacitor to enable the control for a time period of several hundreds of microseconds when an outage of the power source occurred. The servo amplifier 4 is also capable of providing an electric power for lifting up the gravitating axis by an electric energy stored in the capacitor for several hundreds of $\mu$m. Therefore, since the time period necessary for lifting up the gravitating axis is shorter than the time period for which the servo system operates when the outage of the power source occurs, the above-described shutdown processing can be performed in the outage of the power source.

There is a case where the servo controller for controlling a machine, such as a robot, performs a control of operating the mechanical brake on the gravitating axis and then discontinue the excitation of the servomotor for the sake of saving energy when the machine does not operate for a set time period or longer. The present invention is applicable to such a case for saving energy by setting the shutdown flag F1 to "1" when the machine does not operate for a set time period or longer to perform the above described shutdown processing.

Thus, the present invention is applicable to an operation for temporally stopping the motion of the machine in the midst thereof to maintain the stopped position by effecting mechanical brakes on gravitating axes and discontinue the excitation of the servomotor.

Figure 5:
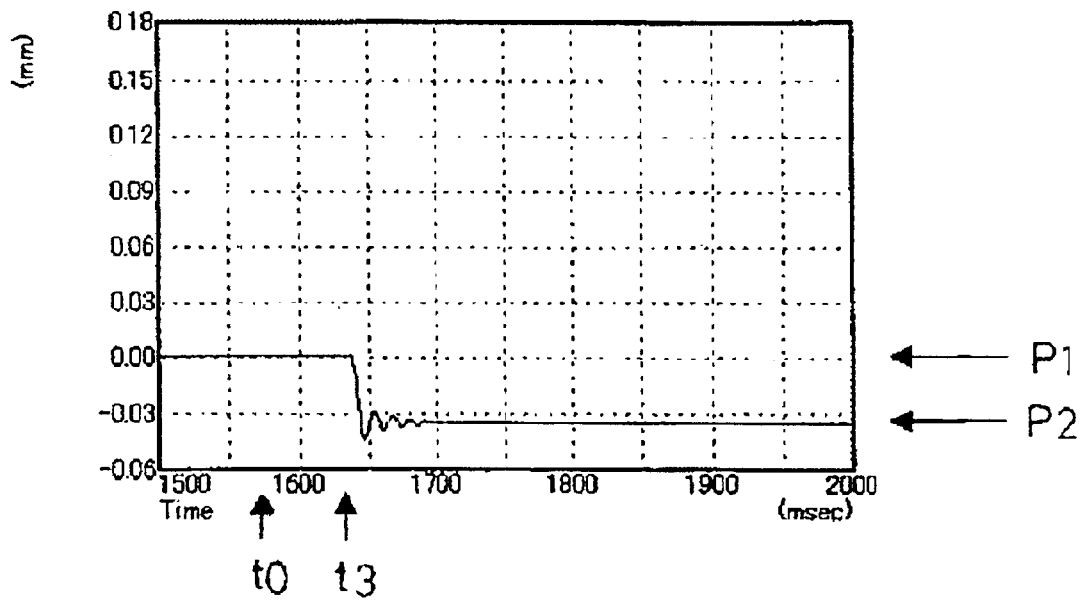
FIG. 5 is a graph showing a result of measurement of the position of the gravitating axis in an emergency stop according to the conventional method.
Figure 6:
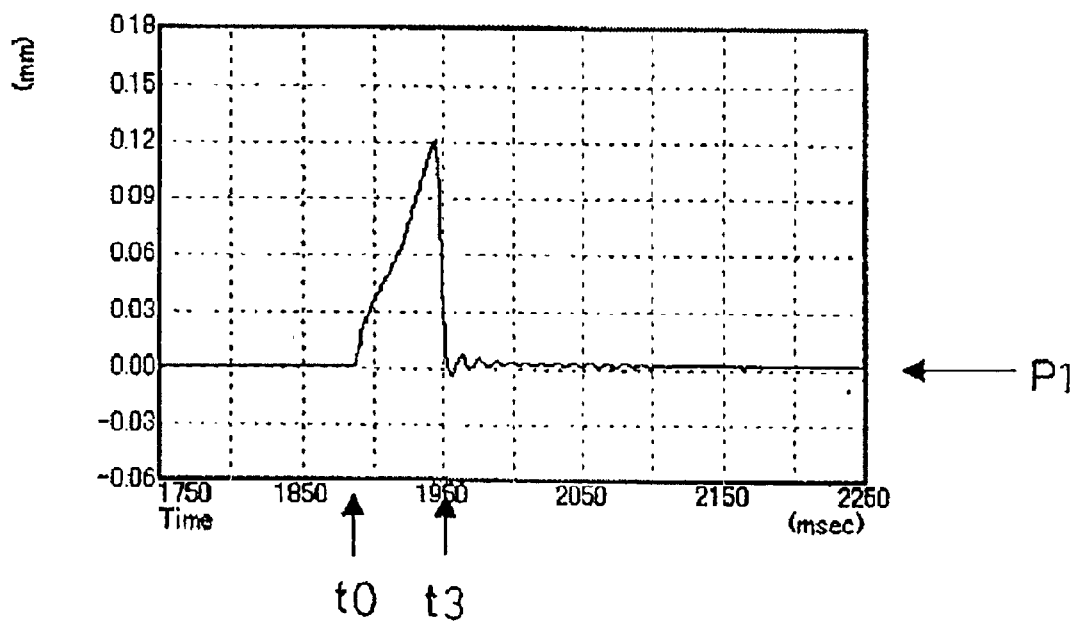
FIG. 6 is a graph showing a result of measurement of the position of the gravitating axis in an emergency stop according to the present invention.

FIGS. 5 and 6 show results of measurement of displacement amounts of the gravitating axis in operations of discontinuing the excitation of the servomotor according to the conventional method and the method of the present invention based on detected data of the position/velocity detector. FIG. 5 shows a result of measurement according to the conventional method and FIG. 6 shows a result of measurement according to the method of the present invention.

In FIGS. 5 and 6, t0 represents a point in time at which a shutdown command is issued, t3 represents a point in time at which the supply of electric power to the servomotor is cut off, P1 represents a position before the shutdown command is issued and P2 represents a position after the power off of the servomotor. One division in scale on the axis of ordinate is 50 ms, and one division in scale on the axis of abscissa is 30 $\mu$m.

As can be seen from FIG. 5, the position of the gravitating axis is displaced downward by approximately 40 $\mu$m when the excitation of the servomotor is discontinued at point t3 in time. Contrary, according to the present invention as can be seen from FIG. 6, the position of the gravitating axis is shifted upward after the point to in time at which the shutdown command is issued and substantially returns to the position P1 at which the shutdown command is issued when the excitation of the servomotor is discontinued at point t3 in time.

Thus, according to the present invention, the position of the gravitating axis is shifted instantaneously upward by the predetermined offset amount when a shutdown command is issued in the case where the excitation of the servomotor is discontinued due to an emergency stop, an outage of power source, etc. and thereafter returns to the position before the shutdown command is issued, to prevent the downward displacement of the gravitating axis in the power-off of the servomotor.

The above embodiment is directed to a servo control system having a position loop and a velocity loop and the offset motion command is provided to the position loop as a position command. The offset amount may be provided to the velocity loop as a velocity command. In this case, the servo control system may not have a position loop. Particularly, in the velocity loop processing, it is determined whether or not the shutdown flag F1 is set to "1" at every processing period. If the shutdown flag F1 is not set to "1", the velocity loop control is performed based on the velocity feedback signal and the velocity command from the position loop or from the host controller to obtain a torque command to be outputted to the current loop.

When it is determined that the shutdown flag F1 turns to "1", the velocity command from the position loop or from the host computer is shut down and a predetermined velocity command for shifting the position of the gravitating axis upward is provided to the velocity loop for a predetermined time period. Namely, providing the predetermined velocity command for the predetermined time period to the velocity loop has an effect equivalent to providing the offset motion command for shifting the gravitating axis upward by the predetermined amount to the position loop. Thus, the offset predetermined amount is defined by the predetermined velocity and the predetermined time period. The offset amount (the predetermined velocity×the predetermined time period) is set a little greater than a displacement amount of the gravitating axis when the excitation of the servomotor is discontinued after the braking force of the mechanical brake 8 is applied to the gravitating axis.

When the offset velocity command is provided to the velocity loop of the servo control system for the predetermined time period, the position of the gravitating axis is shifted by the offset amount in the direction opposing to the gravitation and the mechanical brake is operated by the brake operating command. Thereafter, when the excitation of the servomotor is discontinued, the position of the gravitating axis is displaced downward within an amount not greater than the offset amount, to prevent the movable elements connected to the gravitating axis from collision or interference with a peripheral object, such as a workpiece.

According to the present invention, a collision or an interference between the movable members connected to the gravitating axis and a peripheral object is prevented by maintaining the position of the gravitating axis before the stoppage of the excitation of the servomotor for driving the gravitating axis due to an emergency stop.

What is claimed is:

1. A servo controller for controlling a servomotor for driving a gravitating axis, to which gravitation is exerted, of a machine having a mechanical brake for applying a braking force on the gravitating axis, comprising:

brake operation commanding means for issuing a brake operating command to the mechanical brake when an excitation of the servomotor is discontinued; and offset commanding means for issuing an offset command for driving the servomotor such that a position of the gravitating axis is shifted by an offset amount in a direction opposing to the gravitation exerted on the gravitating axis when the excitation of the servomotor is discontinued.

2. A servo controller according to claim 1, wherein said offset amount is set not less than a backlash in the mechanical brake.

3. A servo controller according to claim 1, wherein the servo controller performs a position loop control of the servomotor and the offset command is provided to the position loop control as a position command.

4. A servo controller according to claim 1, wherein the servo controller performs a velocity loop control and said offset command is provided to the velocity loop control as a velocity command to drive the servomotor at a predetermined velocity for a predetermined time period.

5. A servo controller according to claim 1, wherein the excitation of the servomotor is discontinued when an emergency stop is commanded.

6. A servo controller according to claim 1, wherein the excitation of the servomotor is discontinued when an outage of a power source of the servo controller is detected.

7. A servo controller according to claim 1, wherein the excitation of the servomotor is discontinued when the machine does not operate for a set time period.

8. A servo controller according to claim 1, wherein a shifting motion of the gravitating axis due to the offset command is completed before the braking force of the mechanical brake is actually applied on the gravitating axis.

9. A servo controller according to claim 1, wherein the offset command as issued simultaneously with the brake operating command when the excitation of the servomotor is discontinued.

* * * * *

UNITED STATES PATENT AND TRADEMARK OFFICE
CERTIFICATE OF CORRECTION

PATENT NO. : 6,741,057 B2
DATED : May 25, 2004
INVENTOR(S) : Yasusuke Iwashita et al.

It is certified that error appears in the above-identified patent and that said Letters Patent is hereby corrected as shown below:

Column 3,
Line 51, change "Level" to -- L-level --.

Column 7,
Line 27, change "to" to -- t0 --.

Signed and Sealed this

Thirtieth Day of November, 2004

JON W. DUDAS
*Director of the United States Patent and Trademark Office*